US012590986B2

(12) United States Patent
Quer et al.

(10) Patent No.: US 12,590,986 B2
(45) Date of Patent: Mar. 31, 2026

(54) ACCELERATION-MEASURING SENSOR ASSEMBLY COMPRISING AN ACCELEROMETER SUBASSEMBLY WITH THREE MEASUREMENT AXES, AND A SEISMIC MASS MOVING IN A STRAIGHT LINE ALONG A PRINCIPAL AXIS A, WHICH ASSEMBLY IS MOUNTED IN A HOUSING AND CONFIGURED TO DETERMINE AN ACCELERATION ALONG A MEASUREMENT AXIS Y

(71) Applicant: THALES, Meudon (FR)

(72) Inventors: Régis Quer, Valence (FR); Olivier Lefort, Valence (FR); Jean-René Chevalier, Chatellerault (FR); Sébastien Jaud, Valence (FR)

(73) Assignee: THALES, Meudon (FR)

( * ) Notice: Subject to any disclaimer, the term of this patent is extended or adjusted under 35 U.S.C. 154(b) by 251 days.

(21) Appl. No.: 18/531,482

(22) Filed: Dec. 6, 2023

(65) Prior Publication Data

US 2024/0219419 A1 Jul. 4, 2024

(30) Foreign Application Priority Data

Dec. 29, 2022 (FR) ...................................... 2214621

(51) Int. Cl.
*G01F 15/18* (2006.01)
*G01P 15/08* (2006.01)
*G01P 15/18* (2013.01)

(52) U.S. Cl.
CPC .............. *G01P 15/18* (2013.01); *G01P 15/08* (2013.01); *G01P 2015/0811* (2013.01)

(58) Field of Classification Search
CPC ................................ G01P 15/08; G01P 15/18
See application file for complete search history.

(56) References Cited

U.S. PATENT DOCUMENTS

2007/0059857 A1* 3/2007 Sooriakumar ...... G01P 15/0802
438/50
2017/0205519 A1* 7/2017 Robert ................... G01V 1/201

FOREIGN PATENT DOCUMENTS

EP 1 570 275 B1 10/2011

OTHER PUBLICATIONS

De Freitas, et al., "Measurement of sensor axis misalignment in fibre-optic accelerometers", Measurement Science and Technology, IOP, vol. 17, No. 7, pp. 1829-1825, 2006.
(Continued)

*Primary Examiner* — Eric S. McCall
(74) *Attorney, Agent, or Firm* — BakerHostetler

(57) ABSTRACT

An acceleration-measuring sensor assembly includes an accelerometer subassembly with three measurement axes, mounted in a housing equipped with securing elements, and configured to determine an acceleration along a principal axis A, the assembly comprising: a single-axis principal accelerometer with a seismic mass moving in a straight line along a principal axis A, measuring acceleration along the principal axis A which is misaligned with respect to a reference axis Y by at most 50 mrad, a secondary accelerometer having at least two measurement axes and measuring respectively along two axes X and Z which with the reference axis Y form a direct orthonormal trihedron (O, X, Y, Z), the measurement precision of the two-axis accelerometer along each of its axes being at least ten times inferior to the measurement precision of the single-axis accelerometer, and an electronic processing unit configured to calculate a compensated acceleration S.

6 Claims, 4 Drawing Sheets

(56) References Cited

OTHER PUBLICATIONS

Hiller, et al., "Analysis and Compensation of Cross-Axis Sensitivity in Low-Cost MEMS Inertial Sensors", 2021 IEEE International Symposium on Inertial Sensors and Systems (Inertial), 2021.

* cited by examiner

ACCELERATION-MEASURING SENSOR ASSEMBLY COMPRISING AN ACCELEROMETER SUBASSEMBLY WITH THREE MEASUREMENT AXES, AND A SEISMIC MASS MOVING IN A STRAIGHT LINE ALONG A PRINCIPAL AXIS A, WHICH ASSEMBLY IS MOUNTED IN A HOUSING AND CONFIGURED TO DETERMINE AN ACCELERATION ALONG A MEASUREMENT AXIS Y

CROSS-REFERENCE TO RELATED APPLICATION

This application claims priority to foreign French patent application No. FR 2214621, filed on Dec. 29, 2022, the disclosure of which is incorporated by reference in its entirety.

FIELD OF THE INVENTION

The invention relates to an acceleration-measuring sensor assembly comprising an accelerometer with three measurement axes, and a seismic mass moving in a straight line along a principal axis A, which assembly is mounted in a housing equipped with securing elements and configured to determine an acceleration along a measurement axis Y.

The field of application of the present invention covers all applications that require an accelerometer that is fairly insensitive to transverse accelerations, i.e. accelerations along the two axes that are orthogonal to its sensitive axis.

BACKGROUND

Such an accelerometer is described in document EP 1 570 275 B1 which discloses a number of embodiments of such an accelerometer equipped with a seismic mass guided by guide arms or beams.

FIG. 1 depicts one embodiment of such an accelerometer, in which the seismic mass is situated on one side of the amplification means, the pairs of arms being arranged, nonlimitingly, in a butterfly configuration.

The resonator example considered comprises two beams forming a tuning fork which is made to vibrate in phase opposition by means of two electrodes. It is this tuning fork configuration that is depicted in FIG. 1. It would be equally possible to use by way of resonator a vibrating beam or several vibrating beams or a torsion bar.

The vibrating-beams accelerometer described preferably comprises two measurement cells which can be created by machining a substrate made of silicon-on-insulator (SOI) or of quartz or some other material, although other methods are equally possible.

A silicon-on-insulated substrate consists of a fixed monolithic silicon substrate with a thickness of several hundred microns (for example 450 μm), which constitutes the base of the accelerometer and on its front face bears a fine layer of silicon oxide with a thickness of a few microns (for example 2 μm), itself covered with a layer of monocrystalline silicon with a thickness of a few tens of microns (for example 60 μm). The machining operation consists in attacking the monocrystalline silicon via its front face, until the oxide layer is reached, using a selective etching product which attacks the silicon without significantly attacking the oxide. The etching is stopped once the oxide layer has been bared. This oxide layer may itself be removed by selective attack using another product, so as to leave only the superficial layer of silicon. This layer can then be etched with the desired surface patterns using photoetching techniques or some other technique used in the microelectronics industry in order to obtain the desired mobile plane structure.

The frame of reference O,x,y,z depicted in FIG. 1, is that in which the plane of FIG. 1 is the O,x,y plane, the axis Oz indicating the direction perpendicular to this plane.

The mobile plane structure 10 of a measurement cell of the accelerometer, indicated schematically in FIG. 1, comprises a mobile seismic mass 1 capable of moving translationally along the sensitive axis A of the accelerometer parallel to the axis Oy, which is the axis of the acceleration γ that is to be measured, and amplifying means 2 for amplifying the force that generates this translational movement, which is measured by means of two vibrating beams 30 positioned along an axis Ox perpendicular to the axis Oy and which are subjected to tension or to compression depending on the direction of the acceleration. The beams are arranged symmetrically with respect to an axis of symmetry A of the structure, this axis of symmetry being parallel to the axis Oy when the chip exits production and passing through the centre of gravity of the mass: the geometry of the seismic mass therefore does not affect the performance of the accelerometer.

The vibrating beams 30 are encastré beams with each end built into a rigid termination 4. Each of these terminations 4 comprises a pair of micro-machined arms. The two pairs are symmetrical about the axis of symmetry A. A first micro-machined arm 5 connects the termination 4 to the seismic mass 1. In order to prevent the termination 4 from floating relative to the base, which is to say relative to the fixed monolithic silicon substrate, a second micro-machined arm 6, symmetrical with the first about the axis of the beam, connects the termination 4 to an anchor leg 7 secured to the base. These arms 5 and 6 are respectively connected to the seismic mass 1, to the termination 4 and to the anchor leg 7 by attachment points. The thickness of an arm 5 or 6 may vary along its length.

FIG. 1 also schematically depicts a close-up of part of the amplification means. The first arm 5 is articulated to the termination 4 by an attachment point B. Part of an electrode E has also been depicted. The two vibrating beams 30 are encastré beams built into the termination 4 in as much as they are formed by etching for example from the same layer of material. The hatching indicates the material, monocrystalline silicon for example in the case of a cell created by machining an SOI. As indicated previously, the surface patterns such as the arms 5, attachment point B, termination 4, beams 30 and the electrode E have been obtained by etching the monocrystalline silicon and then attacking the oxide layer.

The angle θ formed by the axis Ox and the line joining the attachment points B and C of the first arm 5, because of the symmetry of the arms 5 and 6 about the axis connecting the terminations via their middle, is symmetrical with the angle formed by the axis Ox and the line joining the attachment points of the second arm 6. This angle θ is small enough that the tensile or compressive force exerted on the beam 30 is greater than the acceleration force exerted on the seismic mass 1.

These amplification means 2 further make it possible to free up space around the vibrating beams 30, notably so as to position the electrodes in the case of electrostatic excitation. It will be recalled that the vibrating beams are made to vibrate at their resonant frequency by means of electrodes positioned facing these beams, or directly on the beams, according to whether the excitation is electrostatic or piezo-electric.

The seismic mass 1 is intrinsically guided in translational movement along the axis Oy as a result of the symmetry of the structure. In order to maintain only this degree of freedom in Oy, the structure may potentially be further stiffened in Ox and Oz via guide arms 8 oriented along the axis Ox, with one end attached to the seismic mass 1 and the other to a part 9 fixed to the base.

The force that generates the translational movement of the seismic mass 1 along the axis Oy is transmitted by the first arms 5 to each of the terminations 4 which, depending on the direction of the translational movement, either move apart or closer together along the axis Ox, thus placing the vibrating beams 30 in tension or in compression. Because the structure 10 is symmetrical about the axis A so far as the arms with respect to the axis of the beams are concerned, the movements of the seismic mass 1, of the terminations 4 and of the beam 30 are perfectly axial. Thus, when the beams 30 form a tuning fork, the tensile or compressive forces are applied to each of the beams of the tuning fork in the same way.

The performance of this structure, which is to say the coefficient of amplification obtained, is simply determined by this angle θ.

When the seismic mass 1 is subjected to an inertial force M·γ in Oy, this force is amplified and transmitted by the amplifying means 2 to the vibrating beams 30. The amplification ratio is substantially equal to 1/tan θ.

FIG. 1 depicts one preferred embodiment in which the seismic mass 1 surrounds the vibrating-beams amplification means 2 as depicted in FIGS. 2 to 5 of document EP 1 570 275 B1. Such a configuration enables the structure obtained to be more compact.

The arms 5, 6 may be arranged in different alternative ways. They may be arranged in a butterfly (or X-shaped) configuration as depicted in FIGS. 1, 2 and 4 of document EP 1 570 275 B1, this arrangement signifying that the first attachment point B attaching the first arm 5 to the termina-tion 4 is situated closer to the axis of symmetry A than its second attachment point C attaching it to the seismic mass 1. In that case, a translational movement of the seismic mass 1 towards the beams 30 then places the beams in compres-sion.

As mentioned at paragraph [0011] of document EP 1 570 275 B1, because of the symmetry of this structure, the movements of the seismic mass, of the build-in terminations and of the resonator are perfectly axial or, in other words, there is an axial movement along just one axis, in this instance the axis A parallel to Oy in FIG. 1, but no sensitivity along the other two, transverse, axes, in this instance the axes Ox and Oy in FIG. 1. This property is fundamental to the context of this invention because it contributes to detect-ing defective mounting.

The measurement axis OY of an acceleration-measuring sensor assembly is always given with respect to a reference, generally the way in which it is attached, one or more centring pins, a reference surface or plane, etc., as illustrated in FIG. 4.

The way in which the accelerometer is assembled or embodied always leads to a certain level of error in aligning the sensitive axis Oy with respect to the measurement axis OY that is to be used.

As illustrated in FIG. 2, the sensitive or principal axis A, parallel to the axis Oy, is vertical but offset from the measurement axis OY by an angle α in the plane XOY, and by an angle β in the plane YOZ, following respective orthogonal projections AXY, AYZ of the sensitive axis A onto these planes.

The angles are oriented angles, measured either in the clockwise direction or in the trigonometric direction.

For each of the transverse axes, because of the transverse insensitivity of the sensors as described in document EP 1 570 275 B1, the acceleration supplied at the sensor output is mathematically corrupted by an error that is due solely to the misalignment at the time of mounting in the case of a transverse acceleration.

This error is given by the following relationship:

$$\text{Error} = \gamma_x \cdot \sin(\alpha) - \gamma z \cdot \sin(\beta)$$

where:

$\gamma_x$ represents the acceleration along the transverse axis X, in m·s$^{-2}$, and $\gamma_z$ represents the acceleration along the transverse axis Z, in m·s$^{-2}$.

Because of the transverse insensitivity of the principal accelerometer, the equation contains no transverse error component intrinsic to the shortcomings of the principal accelerometer as is normally the case with accelerometer technologies different from the accelerometers according to document EP 1 570 275 B1.

This, physically unavoidable, error soon becomes pro-hibitive for applications requiring a small measurement error under transverse acceleration and typically this error needs to be below 1 mg, namely 10$^{-2}$ m/s$^2$ for certified civil aviation applications.

A g is a unit of acceleration corresponding approximately to the acceleration due to gravity at the earth's surface. Its conventional value, defined by the third General Conference on Weights and Measures, 1911, is 9.80665 m·s$^{-2}$.

SUMMARY OF THE INVENTION

The present problem to be addressed notably relates to sensor units for flight controls. Such an application requires a precision to within 3 mrad for the alignment of the sensitive axis, i.e. the sensitive principal axis A, with respect to the measurement axis OY.

This low level of axis alignment error, when the acceler-ometer uses a technology that has non-zero transverse sensitivity, cannot be obtained naturally at the end of the production and assembly process, regardless as to what assembly precautions are taken, and entails manual adjust-ment by operators. This manual operation proves costly compared with the cost of manufacture of the product.

More generally, it is a complicated matter to keep the alignment of the sensitive principal axis A to within one or a few tens of mrad without mechanical adjustment opera-tions which come at a high cost.

This problem is generally addressed by:

severe assembly/production constraints in order to ensure that axis alignment is maintained;

sorting and rejecting;

mechanical adjustment upon mounting the sensor, so as to obtain precise alignment of the sensitive principal axis of the sensor with the measurement axis of the product; or a surface treatment of a reference face, such as by abrading part of the sensor housing so as to compensate for the error.

For example, for an accelerometer based on a pendulum system, the adjustment operation entails a mechanical-adjustment device, with rotation about the two transverse axes (a ball swivel system for example), with an amplitude that is dependent on the initial misalignment at the time of assembly.

Such a device is costly (moving parts, amplitude of adjustment and device for immobilizing once the adjustment has been achieved) and entails a specific adjustment/immobilizing operation prior to calibration of the product.

The solutions of the prior art come at a high cost.

It is an object of the invention to overcome the above-mentioned problems and notably to remain within an error rate or budget under transverse acceleration of less than 1 mg, without, in order to achieve this, conforming to the axis alignment that such a constraint would geometrically entail.

One aspect of the invention proposes an acceleration-measuring sensor assembly comprising an accelerometer subassembly with three measurement axes, mounted in a housing equipped with securing elements, and configured to determine an acceleration along a measurement axis OY, the assembly comprising:

a single-axis principal accelerometer with a seismic mass moving in a straight line along a sensitive principal axis A, insensitive to transverse accelerations, measuring acceleration along the sensitive principal axis A which is misaligned with respect to the measurement axis OY by at most 50 mrad, a secondary accelerometer having at least two measurement axes and measuring respectively along two axes X and Z which with the measurement axis OY form a direct orthonormal trihedron (O, X, Y, Z), the measurement precision of the two-axis accelerometer along each of its axes being at least ten times inferior to the measurement precision of the principal single-axis accelerometer, and an electronic processing unit configured to perform calculations and at output deliver an acceleration S compensated for by means of the following relationship:

$$S = S_{prA} - \mu_{CalZ} \cdot S_{secX} + \mu_{CalX} \cdot S_{secZ}$$

in which:

$S_{prA}$ represents the acceleration measurement along the sensitive principal axis A;

$\mu_{Calx}$, $\mu_{CalZ}$ represent the parameters compensating respectively for the alignments of axes X, Z of the sensor as a whole, these being dimensionless quantities, measured after assembly of the sensor as a whole; and $S_{secX}$, $S_{secZ}$ represent the compensation acceleration along the transverse axis X and along the transverse axis Z, respectively.

According to one embodiment, the electronic control unit comprises a microcontroller or a digital signal processor (DSP).

In one embodiment, the electronic control unit comprises an FPGA programmable integrated circuit.

According to one embodiment, the two-axis accelerometer is of the 20 mg class.

According to one embodiment, the principal accelerometer is of the 1 mg class.

In one embodiment, the two-axis accelerometer is misaligned from the axes X and/or Z by 50 mrad at most.

BRIEF DESCRIPTION OF THE DRAWINGS

The invention will be better understood on studying a few embodiments that are described by way of entirely non-limiting examples and illustrated by the appended drawings, in which.

DETAILED DESCRIPTION

Figure 1:
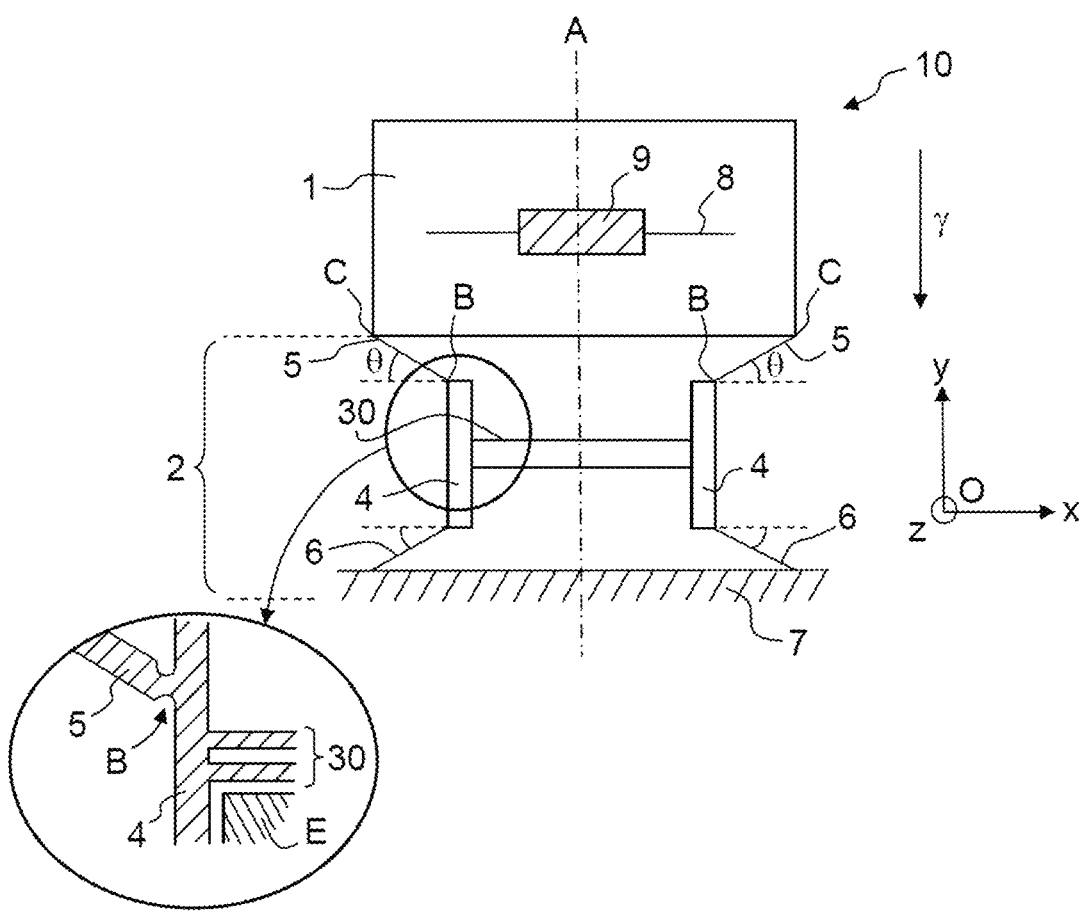
FIG. 1 schematically illustrates an accelerometer with a single measurement axis and a seismic mass (1) moving in a straight line along a principal axis, according to the prior art.
Figure 2:
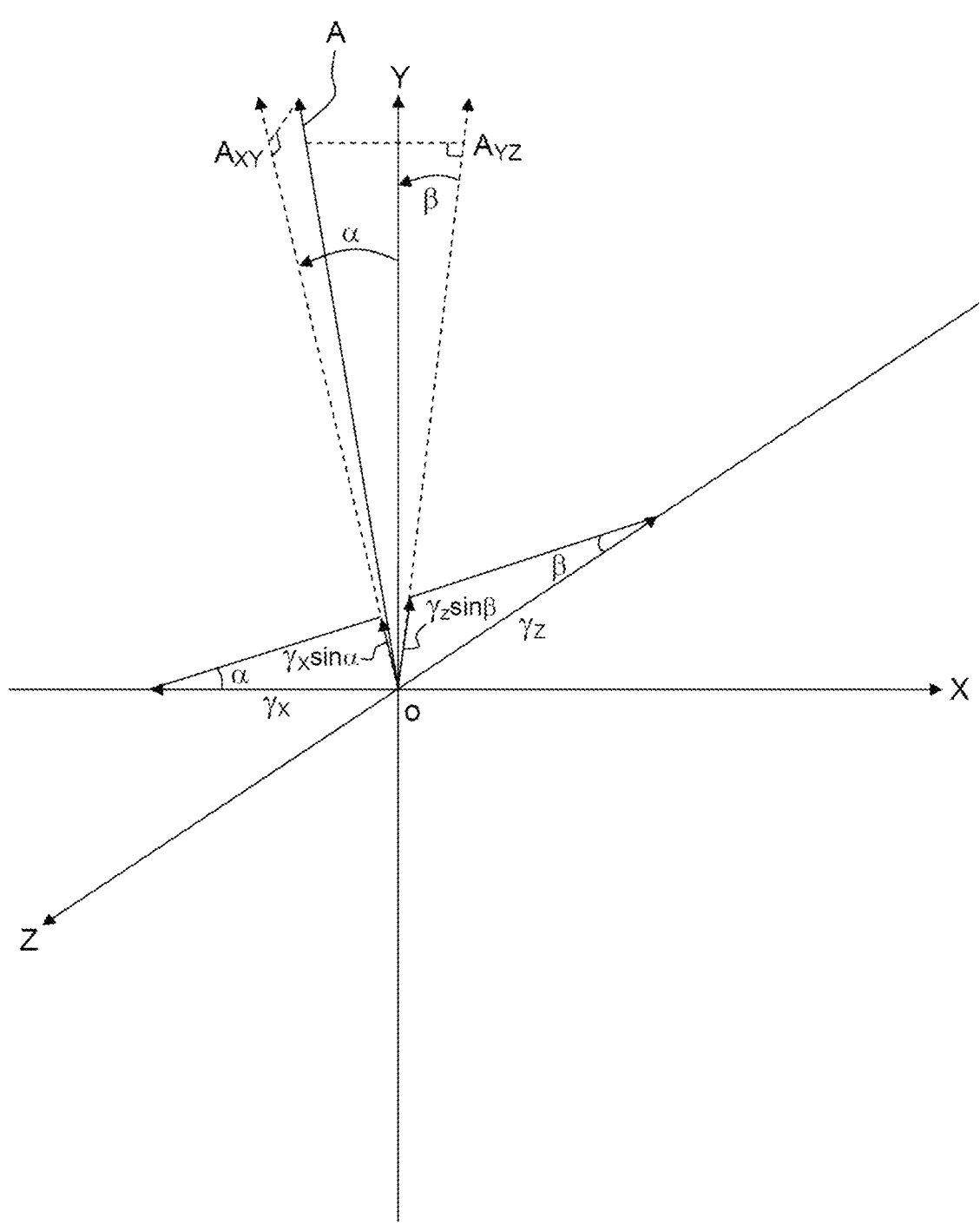
FIG. 2 schematically illustrates the axes of an acceleration-measuring sensor assembly configured to determine an acceleration along a principal axis, according to one aspect of the invention.

FIG. 2 depicts the axes of an acceleration-measuring sensor assembly configured to determine an acceleration along a principal axis A.

Figure 3:
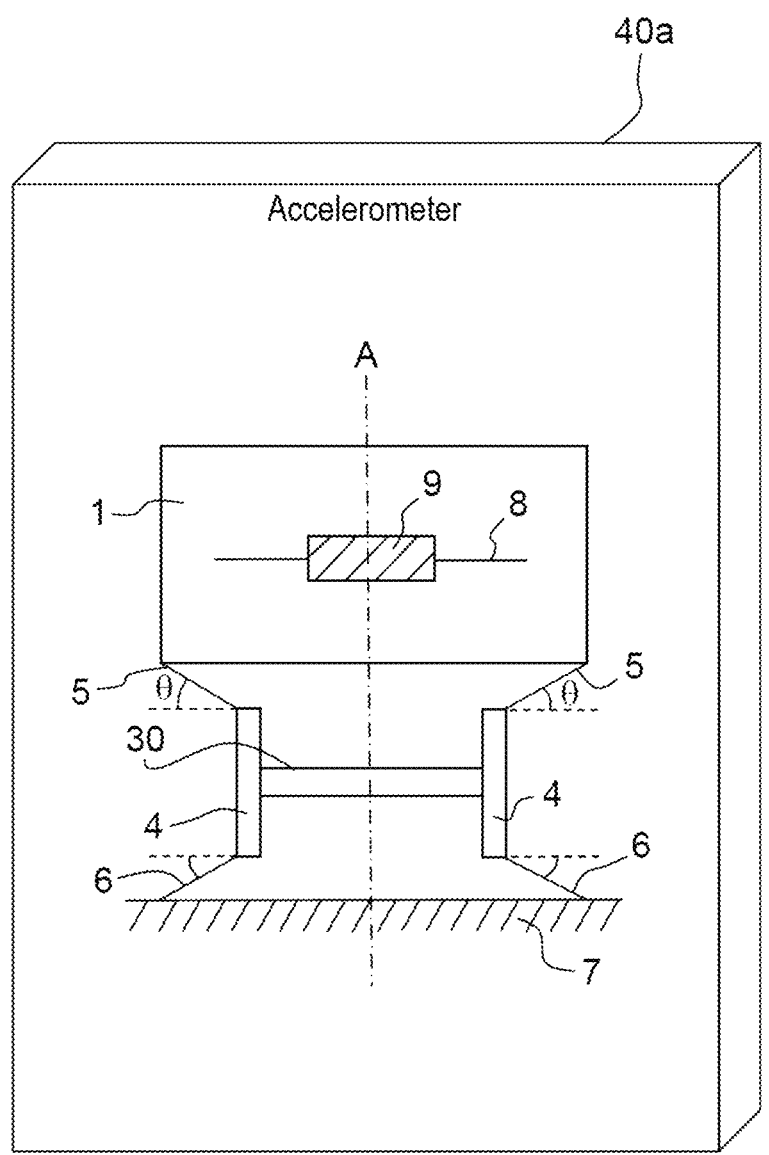
FIG. 3 schematically illustrates a sensor assembly according to one aspect of the invention.

FIG. 3 depicts a sensor assembly according to one aspect of the invention.

Figure 4:
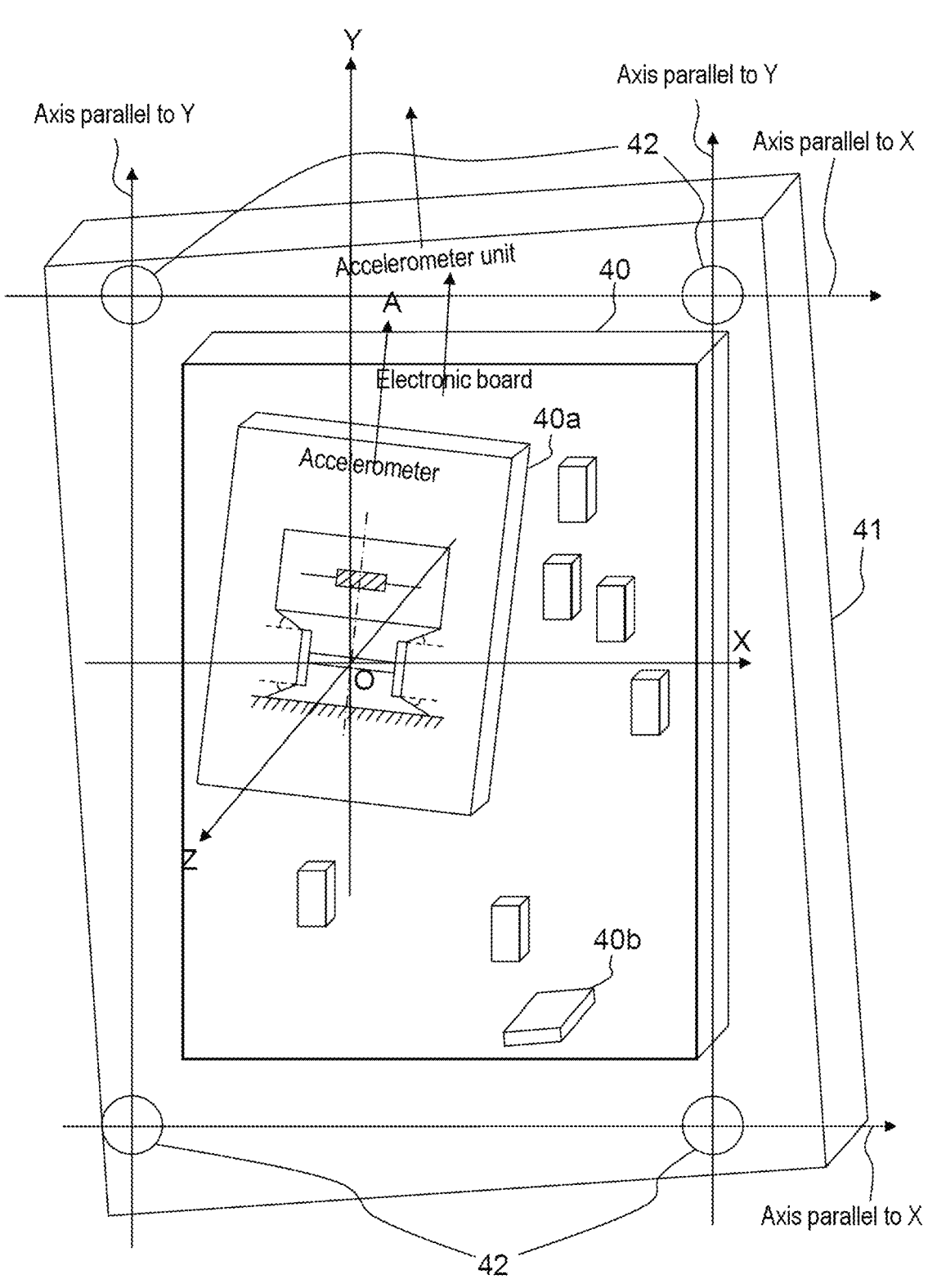
FIG. 4 schematically illustrates a sensor assembly according to one aspect of the invention mounted in a housing with an angular offset of the principal axis with respect to a desired axis.

As depicted in FIG. 4, the sensor assembly comprises a high-performance single-axis principal accelerometer 40a with a seismic mass 1 moving in a straight line along the principal axis A, mounted in a housing 41 equipped with securing elements 42 constituting the reference points of the axes XYZ, and measuring acceleration along the sensitive principal axis A which is misaligned with respect to the measurement axis Y by at most 50 mrad, and an accelerometer 40b measuring respectively along two axes which are more less aligned with the axes X and Z, the axes X and Z forming, with the reference axis Y, a direct orthonormal trihedron (O, X, Y, Z).

In this example, four securing elements 42 have been depicted, these being aligned in pairs horizontally along axes parallel to the axis X and aligned in pairs vertically along axes parallel to the axis Y. This arrangement facilitates mounting.

What is meant by high-performance is in the 1 mg class.

What is meant by more less aligned is that the axes are misaligned with respect to the axes X and/or Z by 50 mrad at most.

The measurement precision of the two-axis accelerometer along each of its axes is at least ten times inferior to the measurement precision of the single-axis accelerometer.

The sensor assembly also comprises an electronic processing unit configured to calculate an acceleration S compensated for by means of the following relationship:

$$S = S_{prA} - \mu_{CalZ} \cdot S_{secX} + \mu_{CalX} \cdot S_{secZ}$$

in which:

$S_{prA}$ represents the acceleration measurement along the principal axis A;

$\mu_{CalX}$, $\mu_{CalZ}$ represent the parameters compensating respectively for the alignments of axes X, Z of the sensor, these being dimensionless quantities, measured after assembly of the sensor; and $S_{secX}$, $S_{secZ}$ represent the compensation acceleration along the transverse axis X and along the transverse axis Z, respectively.

This equation is simplified in comparison with the one known to those skilled in the art as a result of the insensitivity of the principal accelerometer to the transverse accelerations.

The present invention makes it possible to remain within a desired error rate or budget according to the intended application, where transverse acceleration is present, without, in order to achieve this, conforming to the axis alignment that such a constraint would geometrically entail.

To these ends, the acceleration-measuring sensor incorporates, aside from the single-axis sensor that is sensitive only along the principal axis A, needed for measuring the acceleration along the desired measurement axis Y, a secondary accelerometer of inferior performance, at minimum a two-axis accelerometer, assembled in such a way that the secondary axes X and Z form an orthonormal trihedron with the sensitive axis Y of the single-axis principal sensor.

The sensor is then assembled without any special operation for adjusting the alignments of the axes, unlike the costly operations known from the prior art.

The axis alignment errors are measured during standard factory calibration performed at the time of manufacture of the sensor in accordance with methods known from the prior art.

In operation, a sensor assembly according to one aspect of the invention makes it possible to compensate for the effect of the transverse accelerations through calculation (digital component of the microprocessor, digital signal processor or FPGA type) or via an analogue route.

The desired reference axes of the sensor are denoted X, Z (secondary transverse axes) and Y (measurement axis).

The benefit here is that it allows the use of compensating accelerometers of vastly inferior bias performance (by a factor of 10 or more) compared to the one placed along the measurement axis of the sensor, which are above all very inexpensive.

This is possible when the misalignment or lack of alignment is small enough (the production method is well enough controlled), typically less than 50 mrad, that the error projected onto the desired measurement axis Y is, to a first order, no more than that of the projections ($\sin \alpha$; $\sin \beta$) of the error of the two-axis compensation accelerometer. For example, with a misalignment of 10 mrad, the projection onto the sensitive axis is just 10 thousandths of the transverse measurement error.

Assuming that the bias performance of the compensation accelerometer is identical along the axes X and Z ($\mu_{CalX}=\mu_{CalZ}=\mu_{Cal}$) the sensor bias K0, in mg is then bounded (in terms of absolute value) by the following relationship:

$$K0 \le K0_Y + 2 \cdot \mu_{Cal} \cdot K0_{Comp}$$

In which:

$K0_Y$ represents the sensor bias along the axis Y, in mg; and $K0_{Comp}$ represents the sensor bias along each secondary compensation axis X, Z, in mg.

A numerical application example follows: if it is desirable to keep to an error rate of 1 mg using a principal accelerometer (axis A) of the 0.5 mg class, then it is necessary, for example, to have:

a secondary accelerometer providing compensation along the axes X and Z that is in the 25 mg class with 10 mrad of misalignment, a secondary accelerometer providing compensation along the axes X and Z that is in the 12.5 mg class with 20 mrad of misalignment.

These results are particularly advantageous insofar as 20 mg accelerometers can be sourced for a few euros, while the same is certainly not the case for accelerometers in the performance class of 1 mg or under.

The invention claimed is:

1. An acceleration-measuring sensor assembly comprising an accelerometer subassembly with three measurement axes, mounted in a housing equipped with securing elements, and configured to determine an acceleration along a measurement axis OY, the assembly comprising:

a single-axis principal accelerometer with a seismic mass moving in a straight line along a sensitive principal axis A, insensitive to transverse accelerations, measuring acceleration along the sensitive principal axis A which is misaligned with respect to the measurement axis OY by at most 50 mrad, a secondary accelerometer having at least two measurement axes and measuring respectively along two axes X and Z which with the measurement axis Y form a direct orthonormal trihedron (O, X, Y, Z), the measurement precision of the two-axis accelerometer along each of its axes being at least ten times inferior to the measurement precision of the principal single-axis accelerometer, and an electronic processing unit configured to perform calculations and at output deliver an acceleration S compensated for by means of the following relationship:

$$S = S_{prA} - \mu_{CalZ} \cdot S_{secX} + \mu_{CalX} \cdot S_{secZ}$$

$S_{prA}\mu_{CalX}$, $\mu_{CalZ}$ $S_{secX}$, $S_{secZ}$ wherein:

$S_{prA}\mu_{CalX}$, $\mu_{CalZ}$ $S_{secX}$, $S_{SecZ}$ represents the acceleration measurement along the sensitive principal axis A;

$S_{prA}\mu_{CalX}$, $\mu_{CalZ}$ $S_{secX}$, $S_{secZ}$ represent the parameters compensating respectively for the alignments of axes X, Z of the sensor as a whole, these being dimensionless quantities, measured after assembly of the sensor as a whole; and $S_{prA}\mu_{CalX}$, $\mu_{CalZ}$ $S_{secX}$, $S_{secZ}$ represent the compensation acceleration along the transverse axis X and along the transverse axis Z, respectively.

2. The sensor assembly according to claim 1, wherein the electronic control unit comprises a microcontroller or a processor for digitally processing the signal.

3. The sensor assembly according to claim 1, wherein the electronic control unit comprises an FPGA programmable integrated circuit.

4. The sensor assembly according to claim 1, wherein the two-axis accelerometer is of the 20 mg class.

5. The sensor assembly according to claim 1, wherein the principal accelerometer is of the 1 mg class.

6. The sensor assembly according to claim 1, wherein the two-axis accelerometer is misaligned from the axes X and/or Z by 50 mrad at most.

* * * * *